US012750553B2

(12) United States Patent
Kawano

(10) Patent No.: US 12,750,553 B2
(45) Date of Patent: Sep. 29, 2026

(54) INFORMATION PROCESSING SYSTEM, NON-TRANSITORY COMPUTER READABLE MEDIUM STORING PROGRAM, AND INFORMATION PROCESSING METHOD

(71) Applicant: FUJIFILM Business Innovation Corp., Tokyo (JP)

(72) Inventor: Yusuke Kawano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/455,639

(22) Filed: Aug. 25, 2023

(65) Prior Publication Data

US 2024/0334017 A1 Oct. 3, 2024

(30) Foreign Application Priority Data

Mar. 28, 2023 (JP) ................................. 2023-051831

(51) Int. Cl.
*H04N 21/472* (2011.01)
*H04N 21/431* (2011.01)

(52) U.S. Cl.
CPC ... *H04N 21/47217* (2013.01); *H04N 21/4312* (2013.01)

(58) Field of Classification Search
CPC ..................... H04N 21/4312; H04N 21/47217
See application file for complete search history.

(56) References Cited

U.S. PATENT DOCUMENTS

| | | | | |
|---|---|---|---|---|
| 11,388,479 | B2 * | 7/2022 | Choi | H04N 21/4821 |
| 2002/0194611 | A1 * | 12/2002 | Hodgkinson | H04N 21/4312 725/110 |
| 2008/0235587 | A1 * | 9/2008 | Heie | H04N 7/142 709/231 |
| 2012/0253799 | A1 * | 10/2012 | Bangalore | G10L 15/183 704/E15.001 |
| 2020/0059695 | A1 * | 2/2020 | Choi | H04N 21/482 |

FOREIGN PATENT DOCUMENTS

| | | |
|---|---|---|
| JP | 2007036830 | 2/2007 |

OTHER PUBLICATIONS

"Search Report of Europe Counterpart Application", issued on Feb. 7, 2024, p. 1-p. 8.

Drew Olanoff, "YouTube plalylists now let you share specific clips inside of videos", May 2012, available at: https://web.archive.org/web/20210804194332/https://thenextweb.com/news/youtube-playlists-now-let-you-share-specific-clips-inside-of-videos.

* cited by examiner

*Primary Examiner* — Michael B. Pierorazio
(74) *Attorney, Agent, or Firm* — JCIPRNET

(57) ABSTRACT

An information processing system includes: one or plural of processors configured to: display an operation screen that receives an operation from a user on a display unit; receive an instruction to create, on the operation screen, a first link for playing back a moving image designated by the user from a first playback start time; and collectively arrange, in a case where there is a second link for playing back the designated moving image from a second playback start time on the operation screen, the first link and the second link on the operation screen.

14 Claims, 15 Drawing Sheets

FIG. 7

700

| LINK IDENTIFIER | LINK NAME | LINK TYPE | URL | PLAYBACK START TIME | ... |
|---|---|---|---|---|---|
| 1001 | ●●PROCEDURE MOVING IMAGE 1 | MOVING IMAGE | https://www.douga.xxx/aaaaaaaa | [154,236] | ... |
| 1002 | ○○HOME PAGE | GENERAL SITE | https://www.search.yyy/ | null | ... |
| ⋮ | ⋮ | | | ⋮ | |

INFORMATION PROCESSING SYSTEM, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2023-051831 filed Mar. 28, 2023.

BACKGROUND

(i) Technical Field

The present invention relates to an information processing system, a non-transitory computer readable medium storing a program, and an information processing method.

(ii) Related Art

JP2007-036830A discloses a moving image management system including a client that transmits position information indicating a designated range of moving image content and the posted content to a server in a case where a user inputs a post about the designated range, and the server that records the designated range and the posted content received from the client as metadata in association with information that specifies a location of the moving image content, in which the posted content of the metadata is searched for, posted content satisfying search conditions is displayed on the client, and a metafile in which a target moving image content portion is played back is generated, thereby enabling the user to search for moving image content based on the posted content.

SUMMARY

There is a technique for creating a link for opening content designated by a user on an operation screen that receives an operation from the user. By using this technique, the user may designate a moving image and designate a playback start time indicating from which playback time the moving image is to be played back by inputting a uniform resource locator (URL) or the like, and create a link for playing back the designated moving image from the designated playback start time on the operation screen.

Here, in a case where a plurality of links for playing back the same moving image from different playback start times are individually arranged at distant positions on the operation screen, the operation screen becomes cluttered. In a state in which the operation screen is cluttered, the operability of the user is reduced, and the management of the created link becomes complicated, which may lead to an increase in labor of the user.

Aspects of non-limiting embodiments of the present disclosure relate to an information processing system, a non-transitory computer readable medium storing a program, and an information processing method that suppress cluttering of the operation screen as compared to the case where a plurality of links for playing back the same moving image from different playback start times are individually arranged at distant positions on the operation screen.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including: one or a plurality of processors configured to: display an operation screen that receives an operation from a user on a display unit; receive an instruction to create, on the operation screen, a first link for playing back a moving image designated by the user from a first playback start time; and collectively arrange, in a case where there is a second link for playing back the designated moving image from a second playback start time on the operation screen, the first link and the second link on the operation screen.

BRIEF DESCRIPTION OF THE DRAWINGS

Exemplary embodiment(s) of the present invention will be described in detail based on the following figures, wherein:

FIG. 7 is a diagram showing an example of a management table;

FIG. 9A is a diagram showing a state in which a link object is arranged on an operation screen, and FIG. 9B is a diagram illustrating the link object in more detail;

FIG. 11A is a diagram showing an example of a notification screen for providing a notification to a user who has created a new link, and FIG. 11B is a diagram showing an example of a notification screen for providing a notification to a user who has created an existing link;

DETAILED DESCRIPTION

Hereinafter, an exemplary embodiment of the present invention (hereinafter sometimes referred to as the "present exemplary embodiment") will be described with reference to the accompanying drawings.

Figure 1:
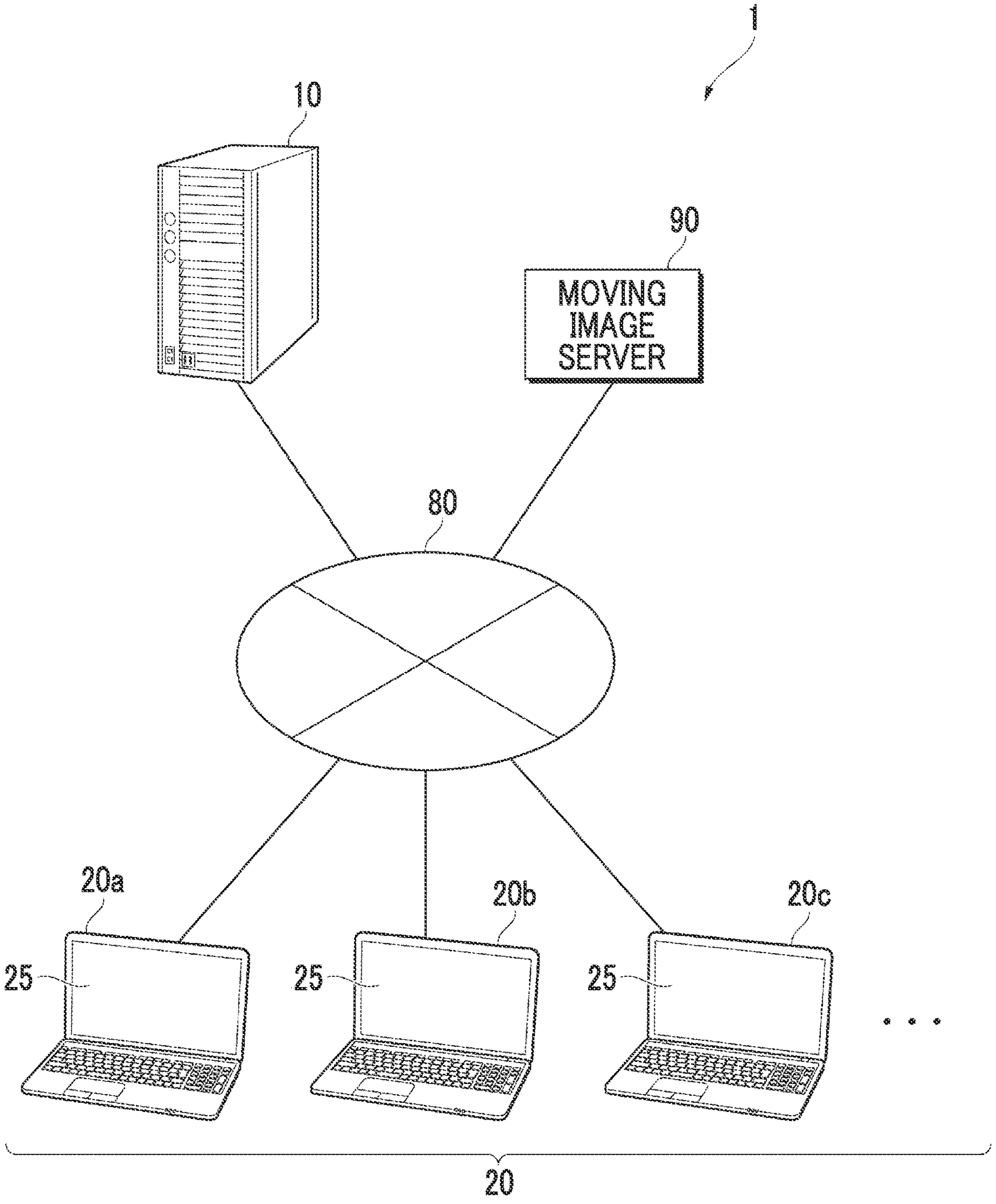
FIG. 1 is a diagram showing an overall configuration of an information processing system according to the present exemplary embodiment.

FIG. 1 is a diagram showing an overall configuration of an information processing system 1 according to the present exemplary embodiment.

The information processing system 1 according to the present exemplary embodiment includes a server apparatus 10 that manages a link and terminal apparatuses 20 (20*a*, 20*b*, 20*c*, . . . ) operated by a user. The server apparatus 10 and each of the terminal apparatuses 20 are connected to each other via a communication line 80.

The communication line 80 is, for example, a line such as the Internet, and is used for communication between the server apparatus 10 and the terminal apparatuses 20.

Further, the server apparatus 10 and each of the terminal apparatuses 20 are connected to a moving image server 90 that provides a web page for displaying a moving image in a viewable manner via the communication line 80.

The moving image server 90 is, for example, a server apparatus that provides a moving image sharing service, and provides a web page (sometimes referred to as a "moving image page") that allows individual viewing of each moving image registered in the own server. The moving image page includes, in addition to the corresponding moving image, various types of information related to the moving image such as a title of the moving image and a description of the moving image set by the user who has registered the moving image.

For example, the moving image server 90 sets and manages a moving image ID, which is identification information for identifying each registered moving image. In addition, a URL for uniquely specifying each moving image page is set in the moving image page of each moving image by using, for example, a moving image ID.

The server apparatus 10 in the present exemplary embodiment is an information processing apparatus that provides a service for managing a link created by a user (hereinafter referred to as a "link management service"). More specifically, the server apparatus 10 performs control for displaying an operation screen (described later with reference to FIG. 3) on a display unit 25 of the terminal apparatus 20 as a user interface (UI) for enabling the use of the link management service in the terminal apparatus 20. In addition, the server apparatus 10 enables the user to create a link, change the content of the link, delete the link (hereinafter collectively referred to as "creation/editing of the link" in some cases), and the like on the operation screen. Furthermore, the server apparatus 10 performs control related to the arrangement of links on the operation screen. The management of these links will be described in detail later.

In addition to the link management service, the server apparatus 10 may provide a document management service that manages a document registered by the user, and the operation screen of the link management service may be used as a UI of the document management service.

Although FIG. 1 shows an example in which the server apparatus 10 is configured with one server, the server apparatus 10 may be configured with a plurality of servers. For example, the server apparatus 10 may be configured as a so-called cloud server.

Here, in the present exemplary embodiment, the "link" is a function used by a user operating the terminal apparatus 20 to open various types of content such as a web page, a moving image, an image, and a document designated as a link destination, and is, for example, a hyperlink. The link in the present exemplary embodiment is arranged on the operation screen as a link object, which is an object such as an image or text with which information for designating a link destination is associated.

In addition, the link in the present exemplary embodiment is arranged on the operation screen by the user performing an operation of designating the link destination and creating the link. The link destination is designated by using a URL of a web page, an address of a storage location where a moving image, an image, a document, or the like is stored, and the like, and the user designates, for example, a URL of a moving image page provided by the moving image server 90 as a link destination, thereby arranging a link for playing back the corresponding moving image on the operation screen. Hereinafter, the link for playing back the moving image is particularly referred to as a "moving image link", and may be distinguished from a link to a web page or the like that does not play back the moving image.

The terminal apparatus 20 in the present exemplary embodiment is an apparatus used for the user to use the link management service and to view content of the link destination. The form of the terminal apparatus 20 includes various information processing apparatuses such as, for example, a computer device, a tablet-type information terminal, a smartphone, and a game device.

Each of the terminal apparatuses 20 is provided with the display unit 25 consisting of a liquid crystal display panel, an organic electro luminescence (EL) display panel, or the like for displaying an image, text information, or the like to a user. The user can use various functions provided as a link management service by performing various operations on the operation screen displayed on the display unit 25. For example, by performing a predetermined operation on the link object arranged on the operation screen, content designated as the link destination can be opened and displayed on the display unit 25. Further, displaying the content of the link destination on the display unit 25 may be referred to as "transition" because the content displayed on the display unit 25 changes. Also, an instruction of transition to the link destination by the user using the link may be referred to as "use of the link".

In the information processing system 1 to which the present exemplary embodiment is applied, in a case where the server apparatus 10 receives the creation of the moving image link from the user, the server apparatus 10 can receive the designation of the link destination and the designation of the location in the total playback time of the moving image at which playback is to be started (sometimes referred to as a "playback start time"). Correspondingly, in the case of using the moving image link in which the playback start time is designated in the terminal apparatus 20, the moving image of the link destination is played back from the designated playback start time.

Figure 2:
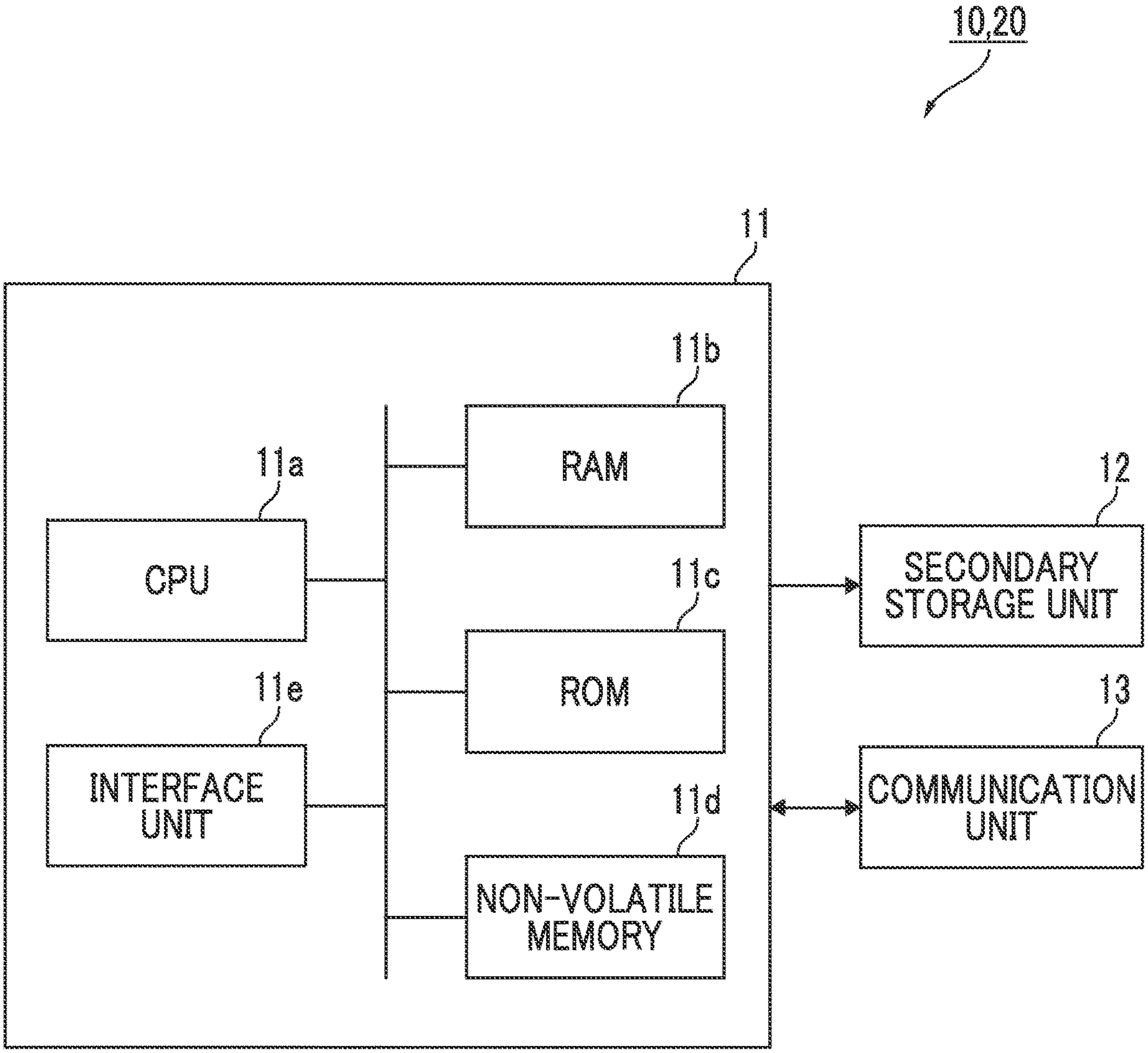
FIG. 2 is a diagram showing an example of a hardware configuration of a server apparatus and a terminal apparatus according to the present exemplary embodiment.

FIG. 2 is a diagram showing an example of a hardware configuration of the server apparatus 10 and the terminal apparatus 20 according to the present exemplary embodiment.

The server apparatus 10 and the terminal apparatuses 20 each include a control unit 11 that controls an operation of the apparatus, a secondary storage unit 12 in which various types of information are recorded, and a communication unit 13 that transmits and receives information via the communication line 80 (see FIG. 1). Note that the control unit 11, the secondary storage unit 12, and the communication unit 13 are connected to each other through a bus or a signal line (not shown).

The control unit 11 includes a central processing unit (CPU) 11*a* that controls an entire apparatus as an example of a processor, a random access memory (RAM) 11*b* that is used as a working memory or the like of the CPU 11*a*, and a read only memory (ROM) 11*c* that stores a program or the like executed by the CPU 11*a*. Further, the control unit 11 includes a non-volatile memory 11*d* that is configured in a rewritable manner and can retain data even in a case where power supply is interrupted, and an interface unit 11*e* that controls each unit such as a communication unit 13 connected to the control unit 11. The non-volatile memory 11*d* is configured with, for example, an SRAM, a flash memory, or the like backed up by a battery. Further, as the control unit 11 reads the program stored in the secondary storage unit 12, each process is executed in each apparatus of the present exemplary embodiment.

The secondary storage unit 12 is configured with, for example, a hard disk device (HDD: hard disk drive), a semiconductor memory, or the like. The secondary storage unit 12 is different depending on the product form of each apparatus. The secondary storage unit 12 stores programs executed by the control unit 11 and various types of information.

In addition, the terminal apparatus 20 includes an input device (not shown) such as a keyboard and a mouse, and the display unit 25 (see FIG. 1) configured with a liquid crystal display or the like. Note that, in the terminal apparatus 20, in a case where the input device is a touch panel, the input device and the display unit 25 may be integrally configured.

Here, the creation of the operation screen and the link on the operation screen according to the present exemplary embodiment will be described with reference to FIGS. 1, 3, and 4.

Figure 3:
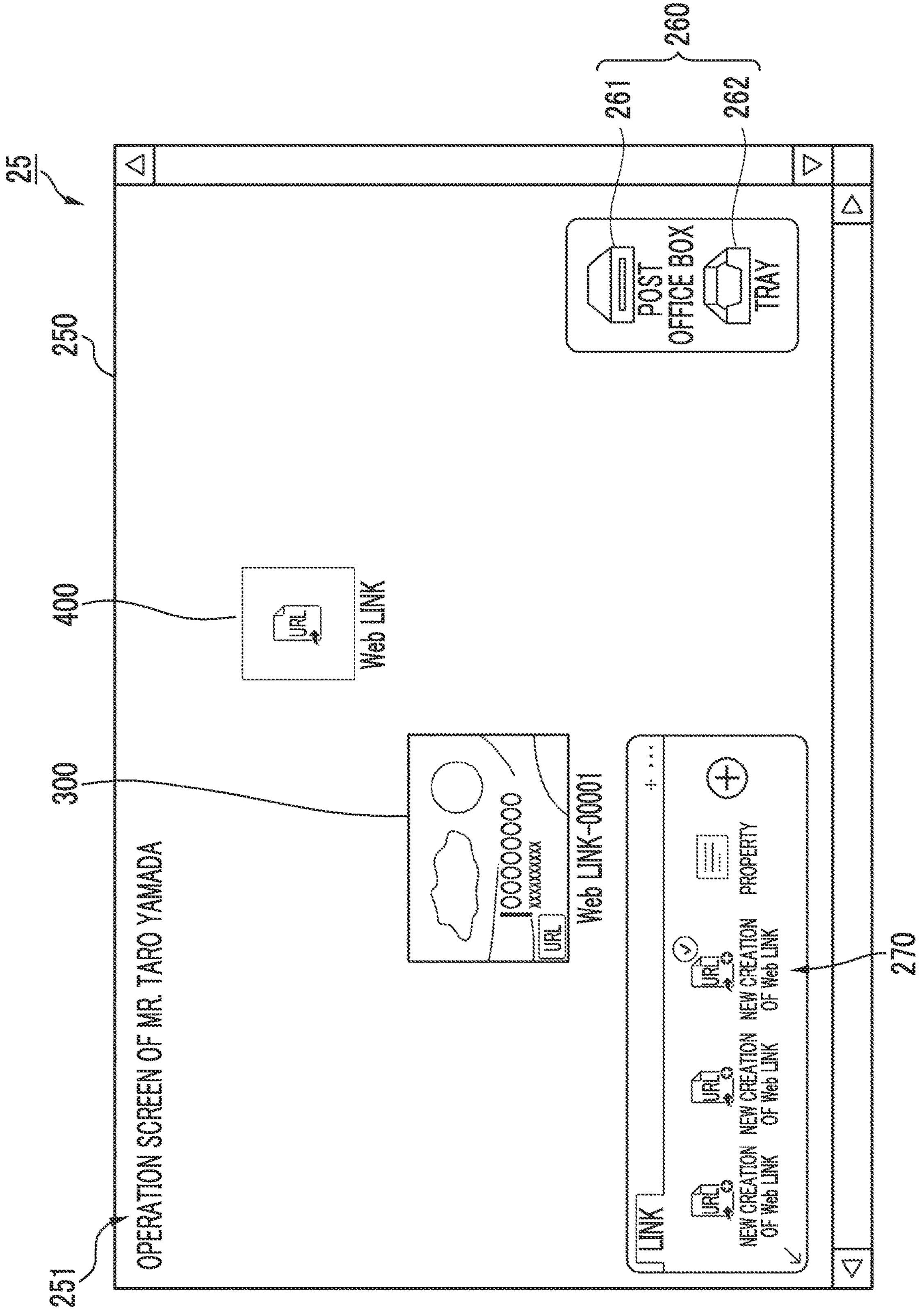
FIG. 3 is a diagram showing an example of an operation screen displayed on a display unit.

FIG. 3 is a diagram showing an example of an operation screen 250 displayed on the display unit 25.

Figure 4:
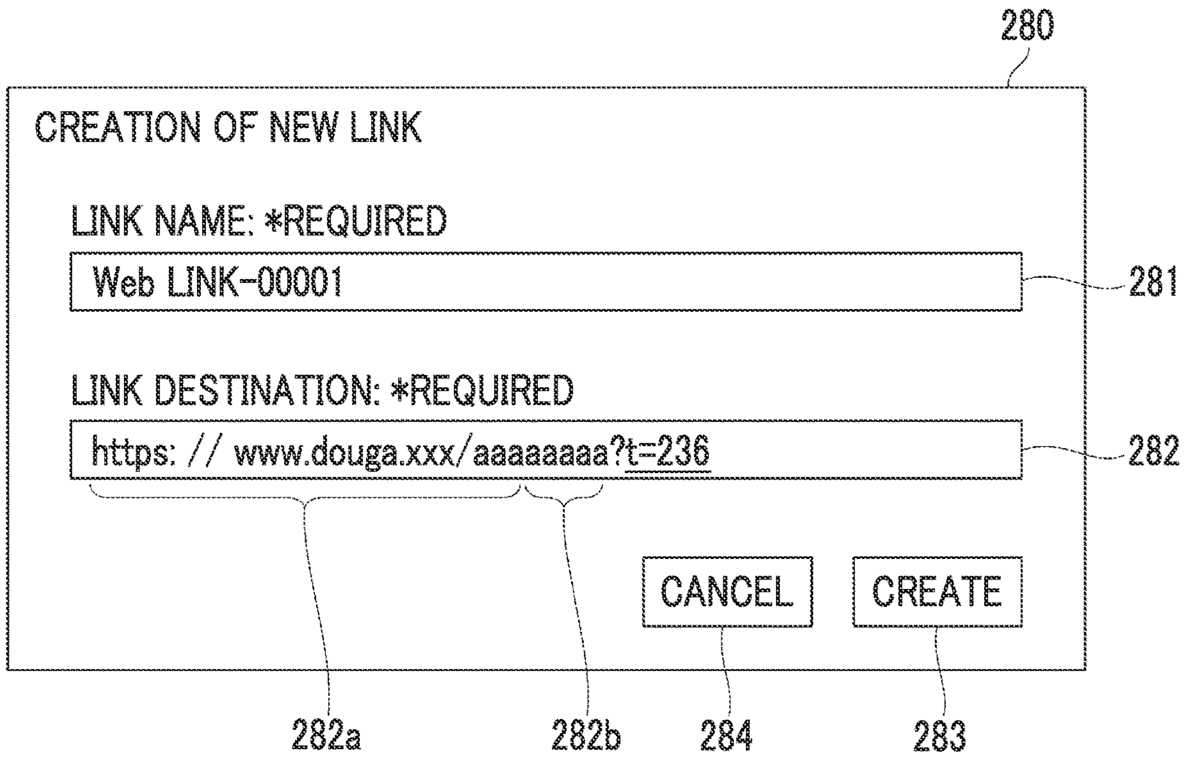
FIG. 4 is a diagram showing an example of a link creation screen.

FIG. 4 is a diagram showing an example of a link creation screen 280.

The operation screen 250 in the present exemplary embodiment is a screen that is displayed on the display unit 25 and receives a user operation in a case where the link management service is used from the terminal apparatus 20. The terminal apparatus 20 according to the present exemplary embodiment displays the operation screen 250 on the display unit 25 according to screen information received from the server apparatus 10. In addition, the server apparatus 10 according to the present exemplary embodiment controls display of the operation screen 250 on the display unit 25 of the terminal apparatus 20 by transmitting the screen information to the terminal apparatus 20.

The number of operation screens 250 that can be provided by the server apparatus 10 is not limited to one, and it is assumed that a plurality of operation screens 250 are provided in the present exemplary embodiment. More specifically, for each user of the link management service, an individual operation screen 250 is provided with each user as an administrator, and a plurality of different operation screens 250 are provided to one user according to a request from the user. The server apparatus 10 sets screen identification information unique to each operation screen 250 and manages each operation screen 250. In a case where the user uses the link management service, which operation screen 250 is to be displayed on the terminal apparatus 20 may be decided according to the user identification information (described later with reference to FIG. 5) and selection by the user. In addition, the plurality of operation screens 250 may be switched to each other while using the link management service in response to an instruction from the user. Further, the plurality of operation screens 250 may be displayed in parallel with one terminal apparatus 20.

As shown in FIG. 3, on the operation screen 250 according to the present exemplary embodiment, for example, in addition to link objects 300 and 400 that receive operations using the link, a name 251 of the operation screen 250, a share icon 260 (261, 262) that receives an operation of giving an instruction to share a link, a creation icon 270 that receives an operation of giving an instruction to create a link by the user, and the like are arranged.

In a case where the server apparatus 10 provides the document management service by a common UI, a document icon or the like for opening a document registered in the document management service may be further arranged on the operation screen 250.

The link object 300 is an object functioning as a moving image link, and receives a user operation using the link. In the present exemplary embodiment, in a case where the link object 300 is clicked, the terminal apparatus 20 transitions to the moving image page of the link destination, and the moving image is played back from the designated playback start time. The click is an example of an operation using the link, and different user operations may be used.

Note that the link object 300 shown in FIG. 3 is a link object in a state in which moving image links have not been combined, which will be described later, and in this state, the link object 300 functions only as a moving image link that plays back the designated moving image from one designated playback start time (2 minutes and 34 seconds in the example of FIG. 3). In a case where the moving image links are combined, the link object 300 may function as a plurality of moving image links in which moving images can be played back from different playback start times.

The link object 400 functions as a link to a web page that is not related to the playback of the moving image. In the operation screen 250, the link that is not related to the playback of the moving image, such as the link object 400, may be in a form that can be distinguished from the moving image link, for example. In the example of FIG. 3, the link object 300 includes the above-described thumbnail image, while the link object 400 includes an icon image showing the transition to the link destination with a simple pattern.

The share icon 260 is an icon that receives an operation of giving an instruction to share the link designated by the user. More specifically, by performing an operation of instructing the share icon 260 to share the link in a state in which the link to be shared is designated, the link is transmitted to the designated operation screen 250, and shared with a user who uses the operation screen 250 of the transmission destination. In the present exemplary embodiment, the user can designate the link to be shared and give an instruction to share the link by dragging and dropping the link to be shared onto the share icon 260.

In the example of FIG. 3, as the share icon 260, a post office box icon 261 for using a "post office box" function for sharing a message input by the user together with the link and a tray icon 262 for using a "tray" function for only link sharing are arranged.

The sharing of a link using the share icon 260 is an example, and the link may be shared in response to another user operation.

The creation icon 270 is an icon that receives an operation of giving an instruction to create a new link by the user. In the present exemplary embodiment, in a case where the creation icon 270 is clicked, a link creation screen 280, which is a screen for receiving input of information related to the newly created link, is displayed. The creation of a link using the creation icon 270 is an example, and the link creation screen 280 may be displayed in response to another user operation.

Information input to the link creation screen 280 is used to create link information (described later with reference to FIG. 5) to be transmitted to the server apparatus 10. Then, the server apparatus 10 performs a process related to the arrangement of the link on the operation screen 250 according to the received link information.

As shown in FIG. 4, the link creation screen 280 according to the present exemplary embodiment includes a name input field 281 for inputting a name of a link to be created, a link destination input field 282 for inputting a link destination of a link to be created, a "create" button 283 for giving an instruction to execute link creation, and a "cancel" button 284 for giving an instruction to cancel link creation.

The link destination input field 282 according to the present exemplary embodiment receives designation of the link destination by inputting a URL. In addition, in the link destination input field 282, in a case where the moving image page is the link destination, designation of a playback start time by a query parameter can be received. In the link destination input field 282 in the example of FIG. 4, a URL of the moving image page is input in the portion indicated by a reference numeral 282*a*, and a query parameter is input in the portion indicated by a reference numeral 282*b*. Note that "t=236" indicates that 236 seconds=3 minutes and 56 seconds is designated as the playback start time. Additionally, in a case where the playback start time is not designated, the playback start time is designated as 0 seconds (from the beginning of the moving image).

The input of the URL to the link destination input field 282 described above is an example, and the link destination may be designated by another user operation or method. Also, the input of the query parameter to the link destination input field 282 is an example, and the playback start time may be designated by another user operation or method. For example, on the link creation screen 280, an input field for receiving input of the playback start time may be provided separately from the link destination input field 282.

A functional configuration of the terminal apparatus 20 will be described with reference to FIGS. 1 to 5.

Figure 5:
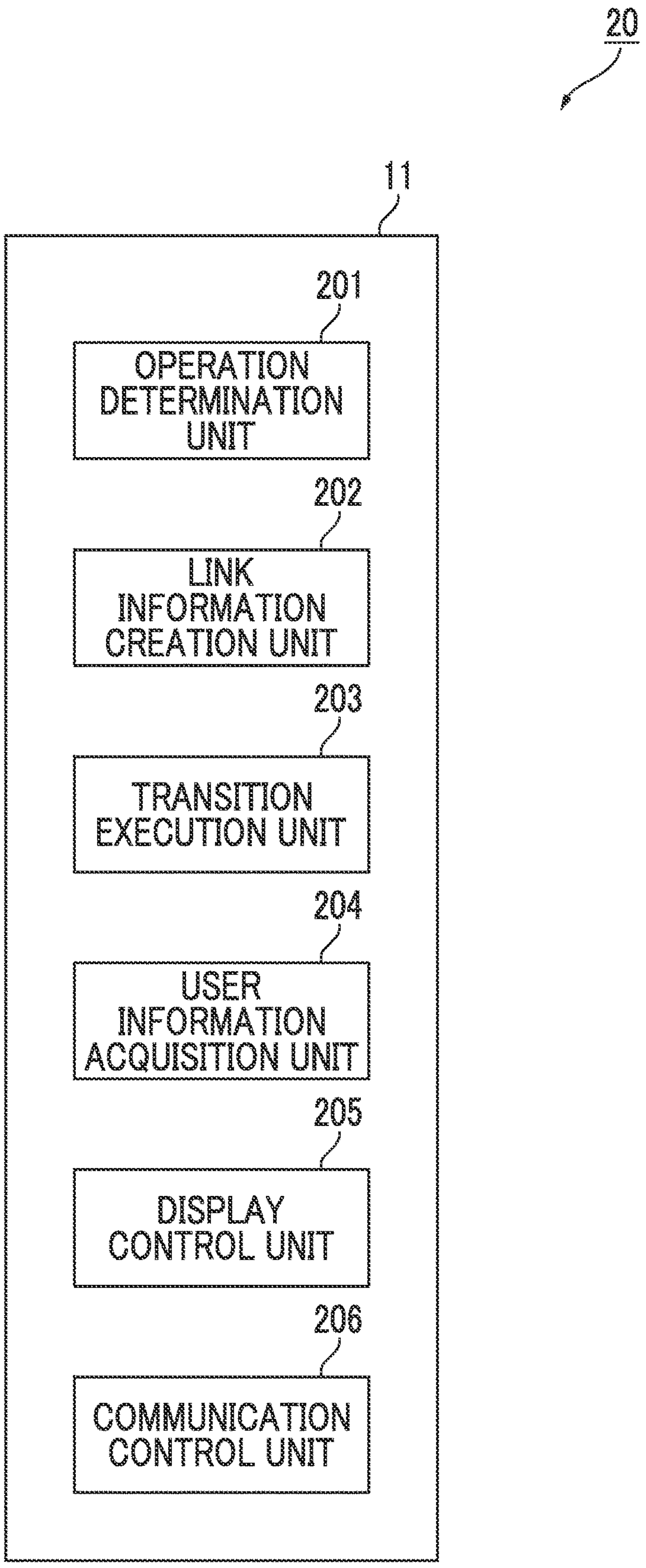
FIG. 5 is a diagram showing a functional configuration example of the terminal apparatus according to the present exemplary embodiment.

FIG. 5 is a diagram showing a functional configuration example of the terminal apparatus 20 according to the present exemplary embodiment. Note that each function is implemented by the control unit 11 of the terminal apparatus 20.

As shown in the drawing, the terminal apparatus 20 according to the present exemplary embodiment includes an operation determination unit 201 that makes a determination related to a user operation, a link information creation unit 202 that creates link information, a transition execution unit 203 that executes transition to a link destination, a user information acquisition unit 204 that acquires information for identifying a user, a display control unit 205 that controls content displayed on the display unit 25, and a communication control unit 206 that controls communication via the communication unit 13.

The operation determination unit 201 determines whether or not a user operation has been performed on the terminal apparatus 20 via an input device or the like. In addition, the content of the operation input is converted into data in response to the user operation via the input device or the like, and can be used by the terminal apparatus or another apparatus. The "user operation" is, for example, an operation of giving an instruction of creation/editing of a link, an operation of inputting text information or the like, an operation of giving an instruction of transition to a link destination, and the like.

The link information creation unit 202 creates link information for creating a new link, based on a user operation related to link creation. The link information includes, for example, the name of the link input by the user on the link creation screen 280, the URL of the link destination, the screen identification information of the operation screen 250 instructed to create the link, and user information of the user who has created the link, and the like.

In addition, the link information creation unit 202 may create link information for updating an existing link on the operation screen 250 based on a user operation related to editing an existing link.

The transition execution unit 203 executes transition to a designated link destination in response to the user using the link on the operation screen 250. More specifically, for example, in a case where a moving image link is designated, the moving image page is displayed on the display unit 25 using information on the moving image page received from the moving image server 90, and the moving image is played back from a designated playback start time.

The user information acquisition unit 204 acquires user information for identifying a user who performs an operation on the operation screen 250 using the terminal apparatus.

As the user information, for example, apparatus identification information unique to each terminal apparatus 20, login information input by the user at the time of starting up the terminal apparatus or using the link management service, and the like are acquired.

The display control unit 205 controls content displayed on the display unit 25. The display control unit 205 according to the present exemplary embodiment controls a display mode of the operation screen 250 based on a user operation received by the terminal apparatus and screen information received from the server apparatus 10. Also, in the transition to the moving image page by the transition execution unit 203, the content to be displayed as the moving image page is controlled according to the information on the moving image page received from the moving image server 90.

The communication control unit 206 processes information transmitted by the communication unit 13 of the terminal apparatus 20 and processes received information. For example, in a case where the user uses the link management service, the communication control unit 206 transmits the user information to the server apparatus 10 to request the provision of the screen information. Also, information used by each functional unit is extracted from the information received from the server apparatus 10. Further, in the transition to the moving image page by the transition execution unit 203, the moving image server 90 is requested to provide information on the moving image page.

Next, a functional configuration of the server apparatus 10 will be described with reference to FIGS. 1 to 3 and FIG. 6.

Figure 6:
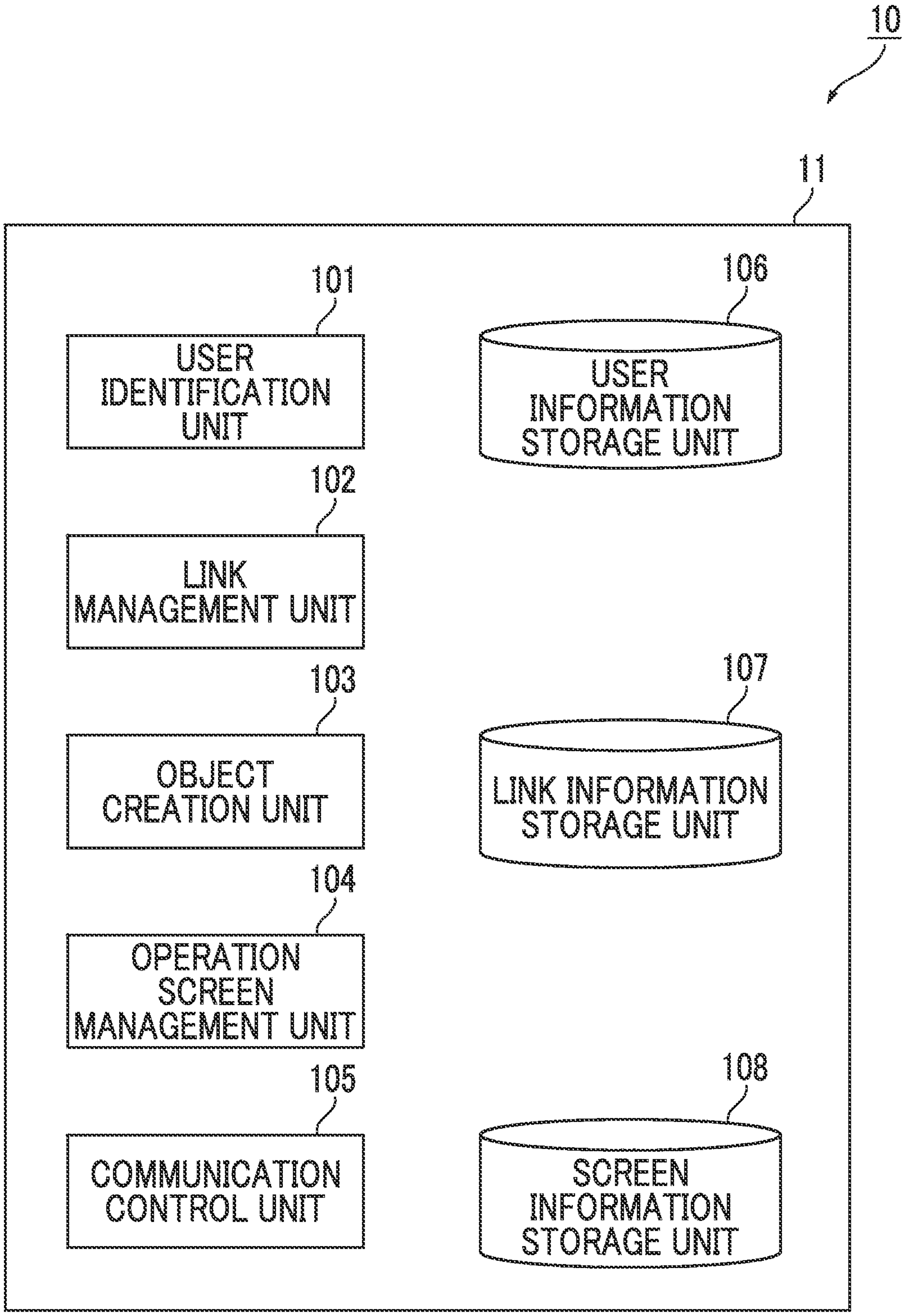
FIG. 6 is a diagram showing a functional configuration example of the server apparatus according to the present exemplary embodiment.

FIG. 6 is a diagram showing a functional configuration example of the server apparatus 10 according to the present exemplary embodiment. Note that each function is implemented by the control unit 11 of the server apparatus 10.

As shown in FIG. 6, the server apparatus 10 according to the present exemplary embodiment includes a user identification unit 101 that identifies a user who performs an operation on the operation screen 250, a link management unit 102 that manages a link, an object creation unit 103 that creates a link object 300, an operation screen management unit 104 that manages display content of the operation screen 250, and a communication control unit 105 that controls communication via the communication unit 13. Further, the server apparatus 10 includes a user information storage unit 106, a link information storage unit 107, and a screen information storage unit 108 as storage locations (databases) for storing various types of stored information. These storage locations are provided by the secondary storage unit 12, for example.

The user identification unit 101 identifies a user who performs an operation on the operation screen 250 using the terminal apparatus 20 based on the user information received from the terminal apparatus 20.

The user identification unit 101 according to the present exemplary embodiment stores the acquired user information in the user information storage unit 106, and manages registered information such as the name and affiliation of the user registered in starting to use the link management service and a usage history of the link management service of the corresponding user in association with each other.

The link management unit 102 manages links based on the link information received from the terminal apparatus 20.

The link management unit 102 according to the present exemplary embodiment collectively manages the link information received from the terminal apparatus 20 in a management table in the link information storage unit 107 for each operation screen 250. More specifically, link information of links created on a certain operation screen 250 is combined for each link object arranged on the operation screen 250 and managed as one management table.

In addition, in a case where the creation of a new moving image link from the terminal apparatus 20 is received, based on link information of a new moving image link (sometimes referred to as a "new link") and an existing moving image link (sometimes referred to as an "existing link"), user operation information received from the terminal apparatus 20, and the like, the link management unit 102 determines whether or not to perform "combination of moving image links" to combine the new link and the existing link. Then, in the case of combining the moving image links, the new moving image link and the existing moving image link are collectively managed as being arranged as a common link object.

FIG. 7 is a diagram showing an example of a management table 700.

The illustrated management table 700 manages the links on the operation screen 250 shown in FIG. 3, and includes link information corresponding to the link object 300 and link information corresponding to the link object 400. More specifically, the second row in the management table 700 is the link information corresponding to the link object 300, and the third row therein is the link information corresponding to the link object 400.

FIG. 7 shows items of a "link identifier", a "link name", a "link type", a "URL", and a "playback start time" in the link information managed by the management table 700. The "link identifier" is management identification information uniquely given to each link object arranged on the operation screen 250. The "link name" is a name of the link set by the user in a case of creating the link, and is a text string input by the user on the link creation screen 280 (see FIG. 4) in the present exemplary embodiment. Further, the "link type" indicates whether or not the link destination is for playing back a moving image, and the link type is set to a "moving image" in a case where the link object is for playing back moving images like the link object 300 and is set to a "general page" in a case where the link object is not related to playing back moving images like the link object 400.

The "URL" and the "playback start time" correspond to a URL designated as the link destination and a playback start time designated for the link for playing back the moving image, respectively.

Here, in a case where the moving image links are combined, a plurality of designated playback start times are managed in the field of the playback start time. In the example of FIG. 7, for the link object 300, the field of the playback start time is set to [154, 236] in response to the fact that a new link designated as a playback start time of "154 seconds (=2 minutes and 34 seconds)" has been combined into an existing link with a playback start time of "236 seconds (=3 minutes and 56 seconds)" described in FIG. 3.

In addition, in a case where a link is shared from one operation screen 250 to another operation screen 250, the link management unit 102 according to the present exemplary embodiment extracts corresponding link information from a management table of one operation screen 250 and stores the extracted link information in a management table of the other operation screen 250. Thereby, it is possible to arrange the shared link on the other operation screen 250 of the sharing destination.

The object creation unit 103 creates a link object to be arranged on the operation screen 250 for each URL of the link destination based on the link information managed by the link management unit 102.

The object creation unit 103 according to the present exemplary embodiment creates a link object including a thumbnail image corresponding to the playback start time designated for the moving image link. Note that the thumbnail image is performed based on thumbnail data received from the moving image server 90. The thumbnail data may include at least information necessary for creating a thumbnail image corresponding to a designated playback start time, and may be, for example, only information of the frame corresponding to the designated playback start time of the moving image, or information of the entire playback time of the moving image.

In addition, in the case of combining the moving image links, the object creation unit 103 according to the present exemplary embodiment updates the link object such that the link object of the existing link also functions as the link object of the new link.

The operation screen management unit 104 manages the operation screen 250 displayed on the terminal apparatus 20.

The operation screen management unit 104 according to the present exemplary embodiment manages each operation screen 250 by creating screen information including information on a link object to be arranged and information on various icons for each operation screen 250. Each operation screen 250 is managed using the screen identification information.

Further, the operation screen management unit 104 updates the screen information of the corresponding operation screen 250 in response to the addition/update of the link information in the link management unit 102 or the creation/update of the link object in the object creation unit 103.

The communication control unit 105 processes information transmitted by the communication unit 13 of the server apparatus 10 and processes received information. For example, the communication control unit 105 requests the terminal apparatus 20 to provide user information, or extracts information used by each functional unit from the information received from the terminal apparatus 20. In addition, for example, in a case where the object creation unit 103 creates the link object, the moving image server 90 is requested to provide thumbnail data.

Here, in the information processing system 1, in a case where an instruction to create a new link for playing back the moving image from a first playback start time is received on a certain operation screen 250 and there is an existing link on the same operation screen 250 for playing back the same moving image from a second playback start time, a process of combining moving image links is performed to collectively arrange the new link and the existing link.

More specifically, in the present exemplary embodiment, by combining the new link for playing back the moving image from the first playback start time and the existing link for playing back the same moving image from the second playback start time into a common link object that can switch between a state of functioning as a new link and a state of functioning as an existing link, the process of combining the moving image links is performed.

The new link is an example of a first link, the existing link is an example of a second link, a state in which the link object functions as a new link is an example of a first state, and a state in which the link object functions as an existing link is an example of a second state.

An example of a processing procedure related to the creation of a new link will be described with reference to FIGS. 1 to 8, and a more detailed description will be given of the process of combining moving image links. Here, a case where a new link is created on the operation screen 250 illustrated in FIG. 3 will be described as an example. Further, as the process of combining the moving image links, a case where new links are combined into the link object 300 of the operation screen 250 shown in FIG. 3 may be described as an example.

Figure 8:
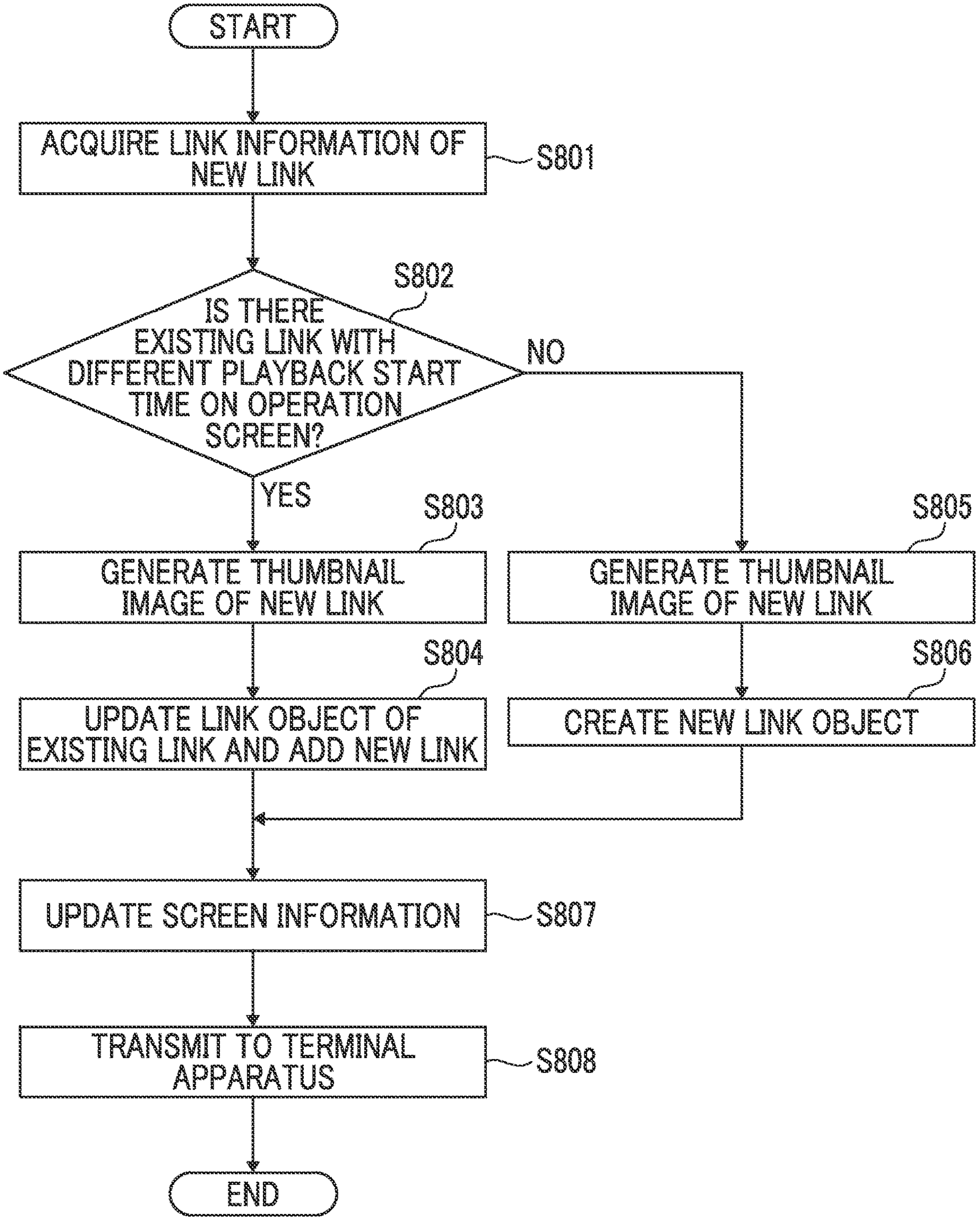
FIG. 8 is a flowchart showing an example of a processing procedure related to creation of a new moving image link.

FIG. 8 is a flowchart showing an example of a processing procedure related to creation of a new moving image link. In FIG. 8, the wording "step" corresponding to the stage of the processing procedure is referred to as "S".

As shown in FIG. 8, in S801, the link management unit 102 of the server apparatus 10 acquires link information of the new link. More specifically, in a case where an operation on the creation icon 270 is performed on the terminal apparatus 20, information is input on the link creation screen 280, and an operation is performed on the "create" button 283, the server apparatus 10 receives and acquires link information of the new link as an instruction to create a new link on the operation screen 250 that has received the operation.

In S802, the link management unit 102 of the server apparatus 10 determines whether or not there is an existing link that plays back the same moving image as the new link received in S801 and that has a different playback start time. More specifically, the link management unit 102 determines whether or not there is an existing link having the URL of the same moving image page as the new link as the link destination in the management table 700. Then, in a case where there is an existing link, the link management unit 102 determines whether or not the playback start time of the new link and the playback start time of the existing link are different. The link management unit 102 determines that there is an existing link with a different playback start time (YES in S802) in a case where there is an existing link and the playback start time differs between the new link and the existing link, and determines that there is no existing link with a different playback start time (NO in S802) in a case where there is no existing link. In a case where there is an existing link for playing back the same moving image and the playback start time is the same between the new link and the existing link, the user is notified of that effect, and the processing procedure ends without creating a new link (not shown in FIG. 8).

In a case where the determination in S802 is YES, the process proceeds to S803, and the object creation unit 103 of the server apparatus 10 creates a thumbnail image corresponding to the playback start time of the new link. Then, in S804, the link object of the existing link is updated and the new link is added using the created thumbnail image and the link information of the new link. More specifically, the link object of the existing link is updated to a link object that can switch between a state of functioning as a new link and a state of functioning as an existing link. For example, the link object 300 shown in FIG. 3 is updated to the link object 300 shown in FIG. 9B, which will be described later.

After updating the link object in S804, in S807, the screen information of the operation screen 250 is updated such that the updated link object is arranged in place of the link object before the update. Then, in S808, the updated screen information is transmitted to the terminal apparatus 20. Accordingly, the process related to the creation of the new link is completed. In a case where the process is completed, the updated link object is arranged on the operation screen 250 displayed on the terminal apparatus 20 in place of the link object before the update, and the operation screen 250 enters the state of FIG. 9A, which will be described later.

With reference to FIG. 8 again, in a case where the determination in S802 is NO, the process proceeds to S805, and the object creation unit 103 of the server apparatus 10 creates a thumbnail image corresponding to the playback start time of the new link. Then, in S806, a new link object is created using the created thumbnail image and the link information of the new link.

After updating the link object in S806, in S807, the screen information of the operation screen 250 is updated such that the new link object is arranged. Then, in S808, the updated screen information is transmitted to the terminal apparatus 20. Accordingly, the process related to the creation of the new link is completed. In a case where the process is completed, the link object of the new link different from the link object of the existing link is arranged on the operation screen 250 displayed on the terminal apparatus 20.

A link object in which moving image links are combined and switching between states of the link objects will be described in detail with reference to FIGS. 9A, 9B, and 10.

Figure 9A:
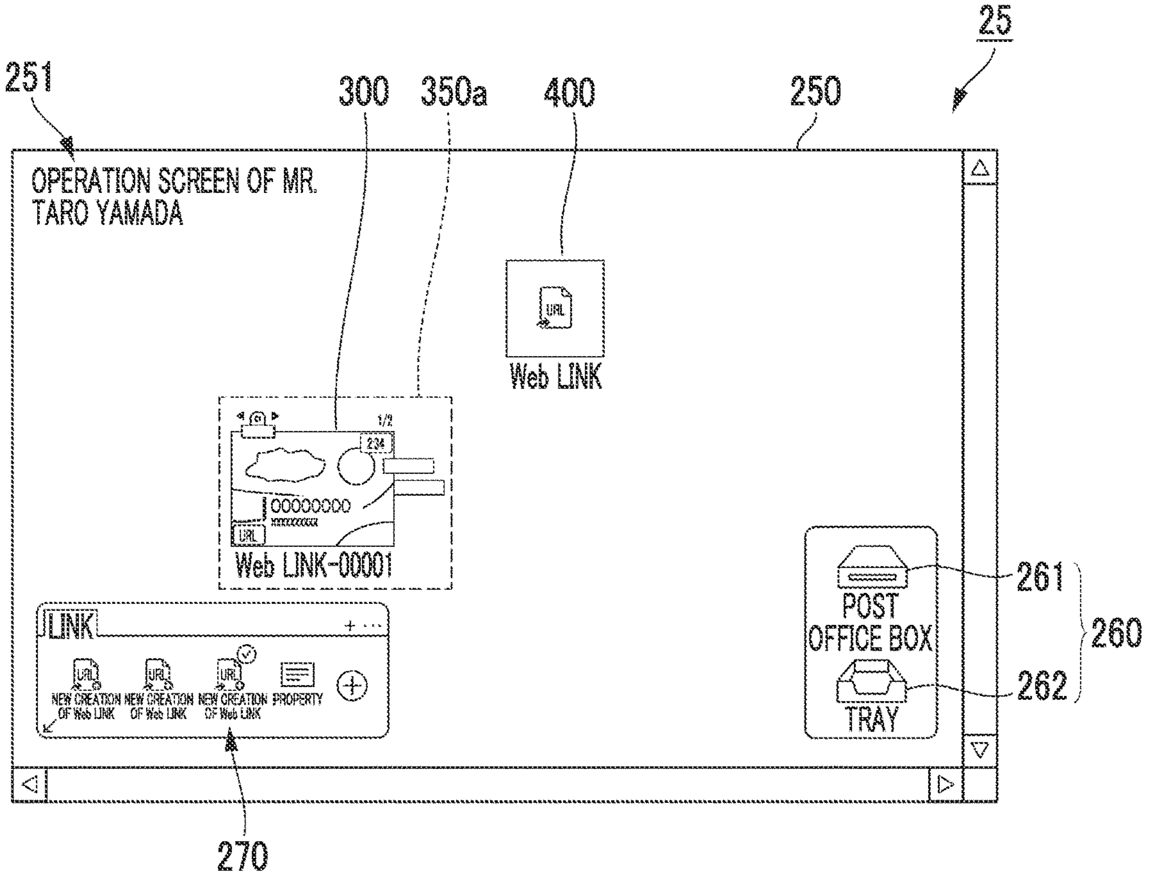
FIGS. 9A and 9B are diagrams illustrating a link object in which moving image links are combined.
Figure 9B:
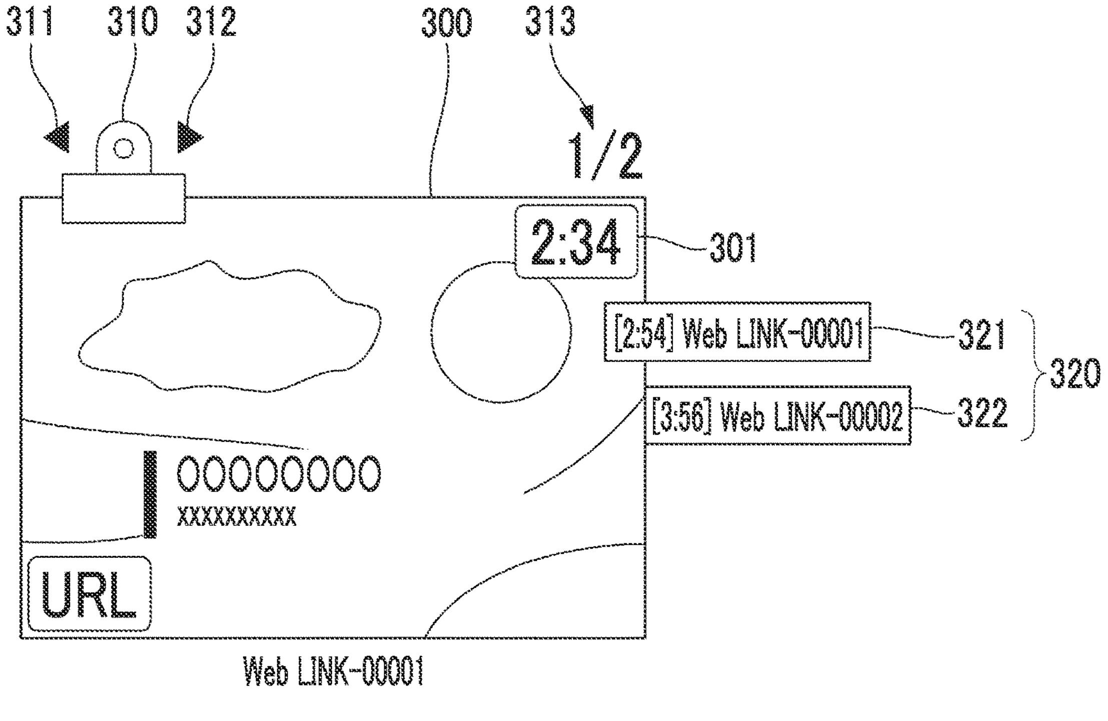

FIGS. 9A and 9B are diagrams illustrating the link object 300 in which moving image links are combined; FIG. 9A is a diagram showing a state in which the link object 300 is arranged on the operation screen 250, and FIG. 9B is a diagram illustrating the link object 300 in more detail. Note that FIG. 9B corresponds to an enlarged view of an area 350 shown by a broken line in FIG. 9A.

Figure 10:
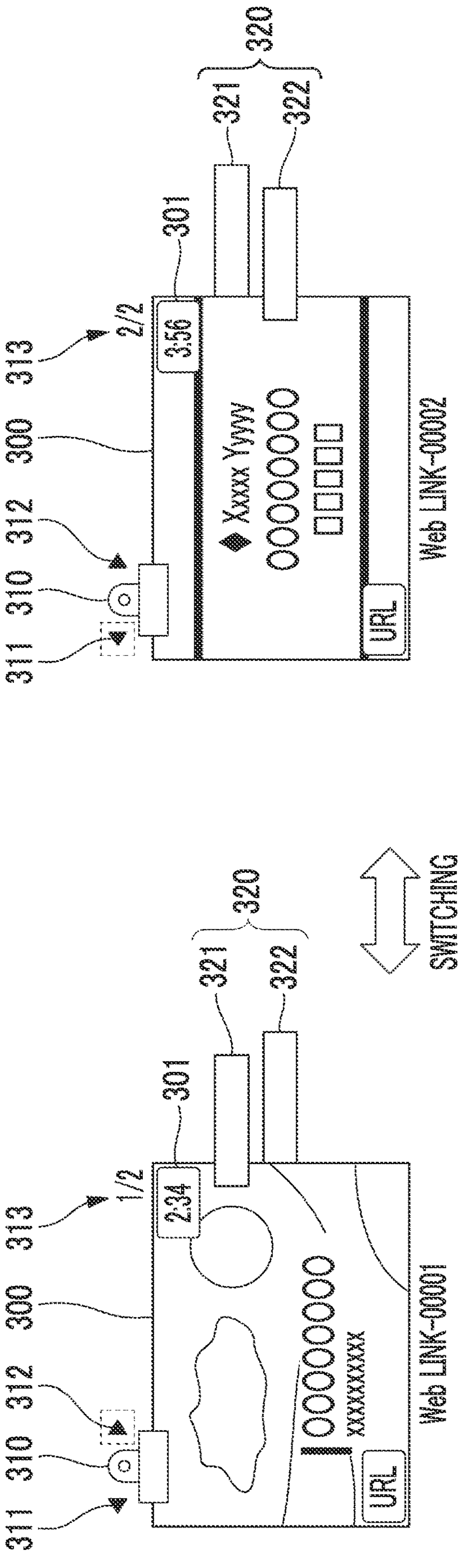
FIG. 10 is a diagram showing how a link object switches between a state of functioning as a new link and a state of functioning as an existing link.

FIG. 10 is a diagram showing how the link object 300 switches between a state of functioning as a new link and a state of functioning as an existing link.

In a case where the moving image links are combined as described above with reference to FIG. 8, the updated link object 300 is arranged on the operation screen 250. In the present exemplary embodiment, the updated link object 300 is arranged at the same position as the link object 300 before the update. Therefore, as the link object 300 is updated, the operation screen 250 is updated from the state shown in FIG. 3 to the state shown in FIG. 9A.

The position where the updated link object 300 is arranged on the operation screen 250 is not limited, and may be arranged at a position designated by the user, for example, in the case of creating a new link.

Here, the form of the link object according to the present exemplary embodiment changes before and after the combination of the moving image links. Specifically, as shown in FIG. 9B, the updated link object 300 is arranged in such a manner that a thumbnail image corresponding to the playback start time of the new link and a thumbnail image corresponding to the playback start time of the existing link are superimposed on each other. In other words, each thumbnail image is arranged as a page in the form of a page bundle. Note that the order in which the thumbnail images are superimposed is decided, for example, according to a playback start time, a date and time when each moving image link is added, and the like.

Further, in the present exemplary embodiment, switching between the state of functioning as the new link and the state of functioning as the existing link is performed in a manner of turning the page of the thumbnail image and performing switching in response to the switching operation, and the link object functions as a link corresponding to the thumbnail image of the top page. The link object 300 shown in FIG. 9B is in a state of functioning as an existing link with a playback start time of 2 minutes and 34 seconds, for example. A link that is in a usable state in a link object may be referred to as a “selected link”.

Further, an additional image 320 including information related to the moving image link corresponding to each thumbnail image is added to each thumbnail image. In the example of FIG. 9B, an additional image 321 including the playback start time and the name of the existing link is added to the thumbnail image of the existing link, and an additional image 322 including the playback start time and the name of the new link is added to the thumbnail image of the new link.

In addition, a combination icon 310 indicating that the moving image links are combined, a return icon 311 and a forward icon 312 that receives the switching operation, and a page icon 313 indicating the number of pages of the selected thumbnail image are added to the updated link object 300.

In the state in which the link object 300 functions as the existing link shown on the left side of the paper in FIG. 10, in a case where the forward icon 312 is operated, the link object 300 switches to the state of functioning as the new link shown on the right side of the paper. More specifically, the link object 300 switches a mode from a state in which the thumbnail image corresponding to the playback start time of the existing link of 2 minutes and 34 seconds is set as a top page to a state in which the thumbnail image corresponding to the playback start time of the new link of 3 minutes and 56 seconds is set as a top page. With the switching of this mode, the transition performed in response to the click of the link object 300 is switched from a transition in which the moving image on the moving image page is played back from 2 minutes and 34 seconds to a transition in which the moving image on the moving image page is played back from 3 minutes and 56 seconds. On the contrary, in the state of functioning as the new link, in a case where the return icon 311 is operated, the link object 300 switches to the state of functioning as the existing link.

Setting a thumbnail image as a top page in a link object is an example of preferentially displaying a thumbnail image. Further, the switching of the state of the link object by the return icon 311 and the forward icon 312 is an example of the switching operation, and the switching may be performed in response to another user operation.

In addition, as shown in FIG. 10, in the present exemplary embodiment, the additional image 322 of the new link can be visually recognized even in a state in which the link object 300 functions as the existing link. In this case, by performing a predetermined user operation such as clicking on the additional image 322, switching to the state of functioning as the new link may be performed. Also, the additional image 322 may be made to function as a new link.

On the contrary, even in a state in which the link object 300 functions as a new link, the additional image 321 of the existing link is visually recognized. In this case as well, by performing a predetermined user operation such as clicking on the additional image 321, switching to the state of functioning as the existing link may be performed. Also, the additional image 321 may be made to function as an existing link.

Incidentally, in a case where a link object in a form in which thumbnail images are superimposed as in the present exemplary embodiment is used, thumbnail images other than the top page cannot be visually recognized unless switching is performed. Therefore, it may be difficult for a user who has created a new link to ascertain which link object the link created by the user has been combined into. In addition, it may be difficult for a user who has created an existing link to ascertain which link object the link created by the user in the past has been combined into. Therefore, in a case where the new link and the existing link are collectively arranged as a common link object, for example, it is better to have a function of notifying the user to that effect.

Figure 11A:
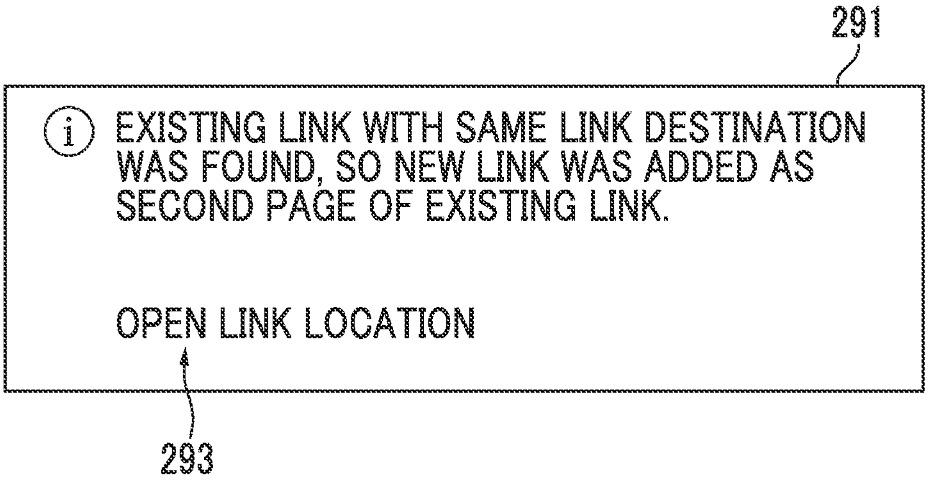
FIGS. 11A and 11B are diagrams illustrating a notification to a user related to addition of a new link.
Figure 11B:
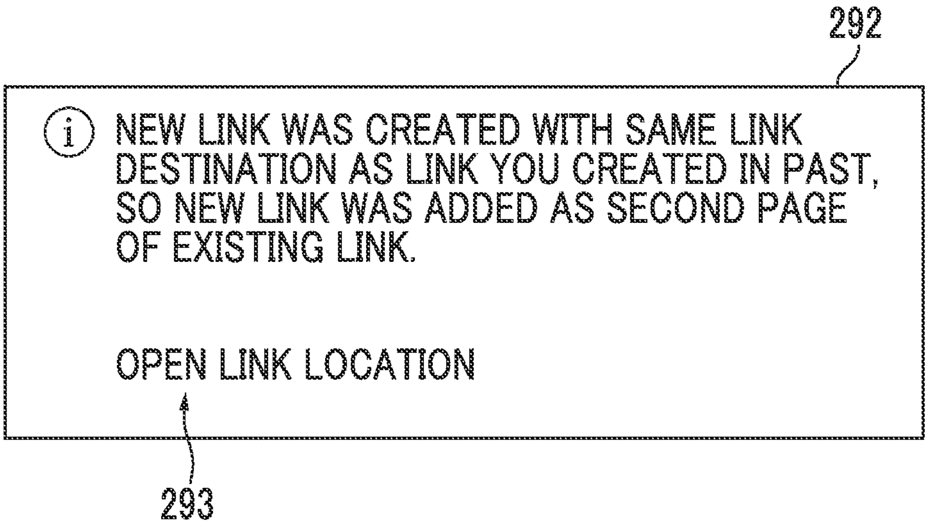

FIGS. 11A and 11B are diagrams illustrating a notification to a user related to addition of a new link; FIG. 11A is a diagram showing an example of a notification screen 291 for providing a notification to a user who has created a new link, and FIG. 11B is a diagram showing an example of a notification screen 292 for providing a notification to a user who has created an existing link.

In the present exemplary embodiment, the user who has created the new link is notified that the created link has been combined into the existing link. As a specific example, as shown in the notification screen 291 shown in FIG. 11A, a check button 293 for checking the link object in which the new links are combined is notified together with a message to the effect that the links have been combined. In a case where an operation is performed on the check button 293, an area on the operation screen 250 in which the corresponding link object is arranged is displayed. At this time, the link object in which the new links are combined may be highlighted or a batch or the like indicating that the new links are combined may be added to the link object to make it easier to ascertain the corresponding link object.

This allows a user who has created a new link to easily ascertain in which link object the links newly created by the user are combined.

Further, in the present exemplary embodiment, the user who has created the existing link is notified that the links created in the past have been combined into the new link. As a specific example, as shown in the notification screen 292 shown in FIG. 11B, the check button 293 is notified together with a message to the effect that the links have been combined.

This allows a user who has created an existing link to easily ascertain in which link object the links created by the user in the past are combined.

Figure 12:
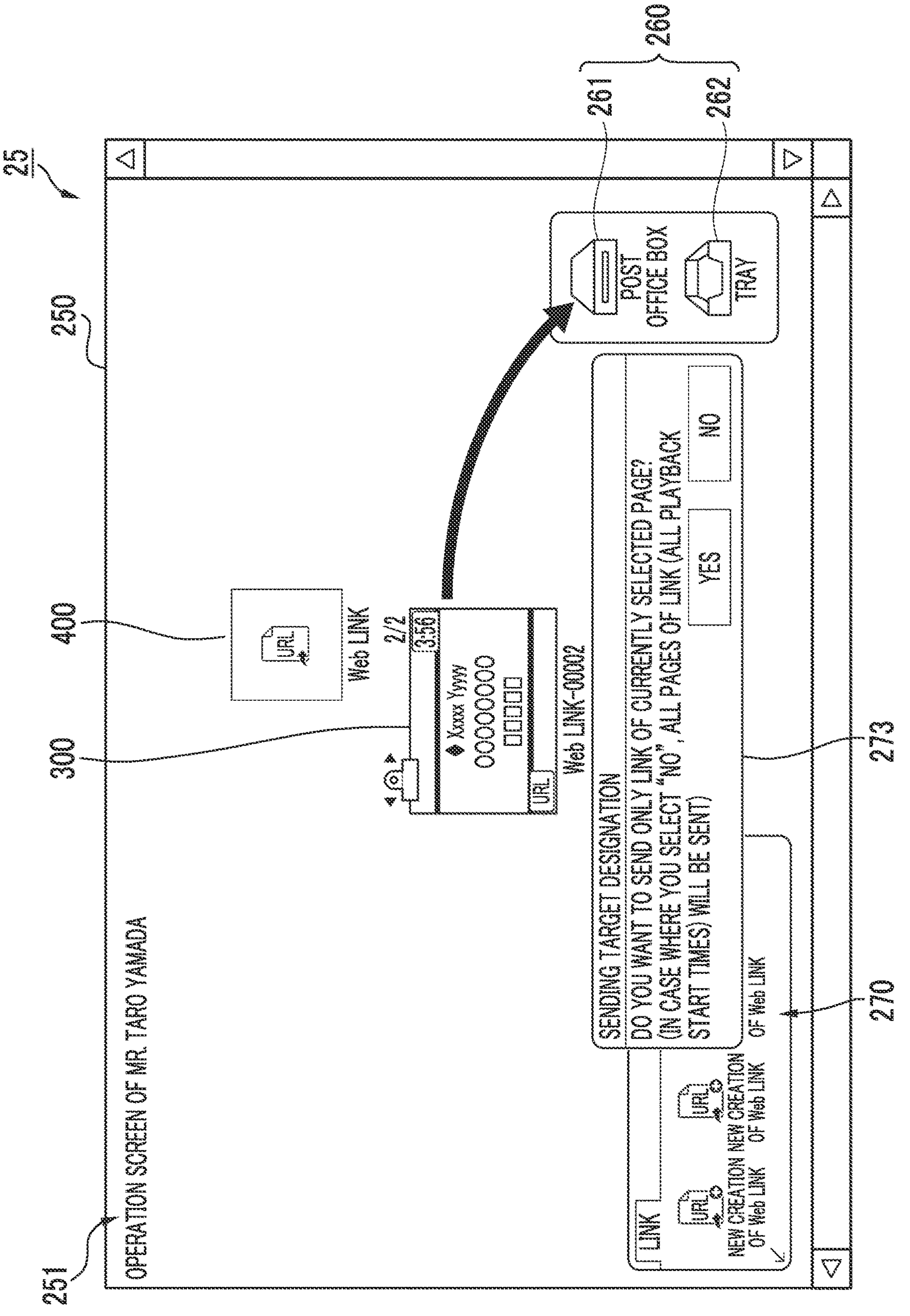
FIG. 12 is a diagram illustrating sharing of a link in a link object in which a new link and an existing link are combined.

FIG. 12 is a diagram illustrating sharing of a link in the link object 300 in which a new link and an existing link are combined.

In the present exemplary embodiment, in an attempt to share the link object 300 in which a new link and an existing link are combined on another operation screen 250, the user is inquired about whether to share all the combined links or only the selected link. In the example of FIG. 12, by dragging and dropping the link object 300 in which the new link and the existing link are combined onto the post office box icon 261, an inquiry screen 273 including a message "Do you want to send only the link of the currently selected page?" is displayed. In the inquiry screen 273, in a case where "Yes" is selected, a link object that functions only as the currently selected link is shared. On the other hand, in a case where "No" is selected, the link object 300 in which the new link and the existing link are combined is shared.

Others, Modification Example, Etc

Creation of New Link

In the above-described exemplary embodiment, as described in S802 of FIG. 8, the link management unit 102 of the server apparatus 10 determines whether or not the new link and the existing link have different playback start times, and in a case where the playback start times differ, the process related to creation of the new link is continued. However, even though the playback start times differ, in a case where the difference is very small, a plurality of links for playing back the same moving image from substantially the same location are arranged. Therefore, in a case where the difference between the playback start time of the new link and the playback start time of the existing link is within a predetermined range, the user may be inquired about whether or not to create new link.

Figure 13:
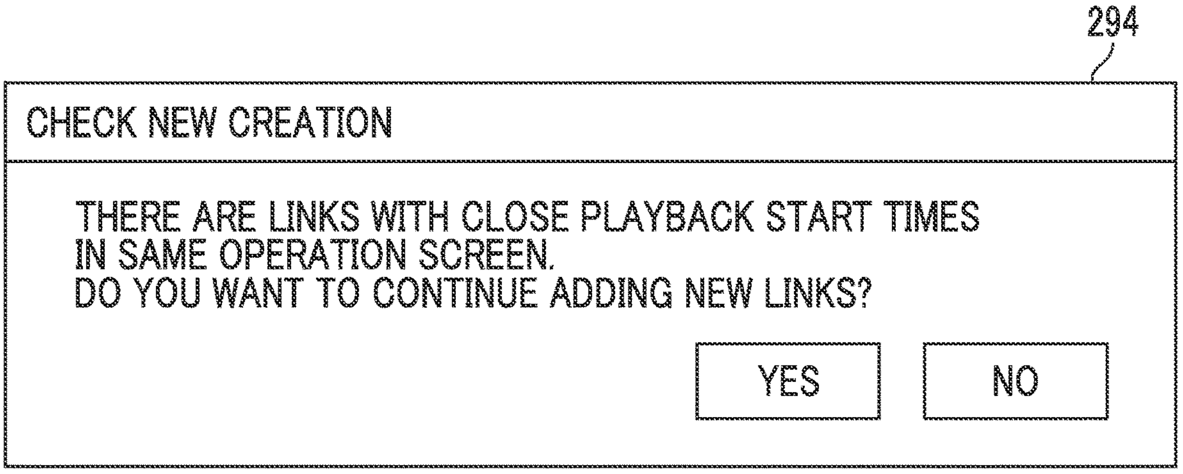
FIG. 13 is a diagram showing an example of a check screen.

FIG. 13 is a diagram showing an example of a check screen 294.

The check screen 294 is a screen for inquiring the user whether or not to create a new link. On the illustrated check screen 294, a message indicating that there is an existing link with a playback start time close to a new link to be created, and a message to inquire whether or not to create a new link are displayed, and in a case where "Yes" is selected, the process related to creation of the new link is continued. On the other hand, in a case where "No" is selected, the process related to creation of the new link is stopped.

The difference between the playback start time of the new link and the playback start time of the existing link described above being within a predetermined range is an example of satisfying a predetermined condition related to the new link and the existing link. In this way, in a case where a predetermined condition related to the new link and the existing link is satisfied, for example, the server apparatus 10 may inquiry of the user whether or not to create the new link. According to such a configuration, creation of a link unnecessary for the user is suppressed as compared to the case where no inquiry is made.

For example, in addition to the above, in the new link and the existing link, a predetermined condition that a degree of similarity of the moving images of the link destination is equal to or higher than a threshold value may be provided. For example, a plurality of users may register the same moving image in the moving image server 90 or the like, and the moving image having the same content may be provided by a plurality of moving image pages having different URLs. In this case, in a case where only the URLs of the new link and the existing link are used as a reference, a plurality of substantially identical or similar links may be created. Therefore, in the information processing system 1, a unit for determining a degree of similarity between the moving images which are link destinations of the new link and the existing link is provided, and in a case where the degree of similarity is equal to or higher than a threshold value, the user may be inquired about whether or not to create a new link.

Link Object

In the above-described exemplary embodiment, the link object is configured to include the thumbnail image, and in a case where the state of the link object is switched, the thumbnail image corresponding to the selected link is preferentially displayed. Such a configuration is not indispensable, and for example, the link object may be configured without including the thumbnail image.

Another Example 1 of Combination of Moving Image Links

The aspect of combining the moving image links is not limited to the above-described exemplary embodiment. For example, a common object in which a new link and an existing link are combined may be arranged on the operation screen 250, and a link object including a portion functioning as a new link and a portion functioning as an existing link may be displayed in response to a predetermined user operation on this object.

Figure 14:
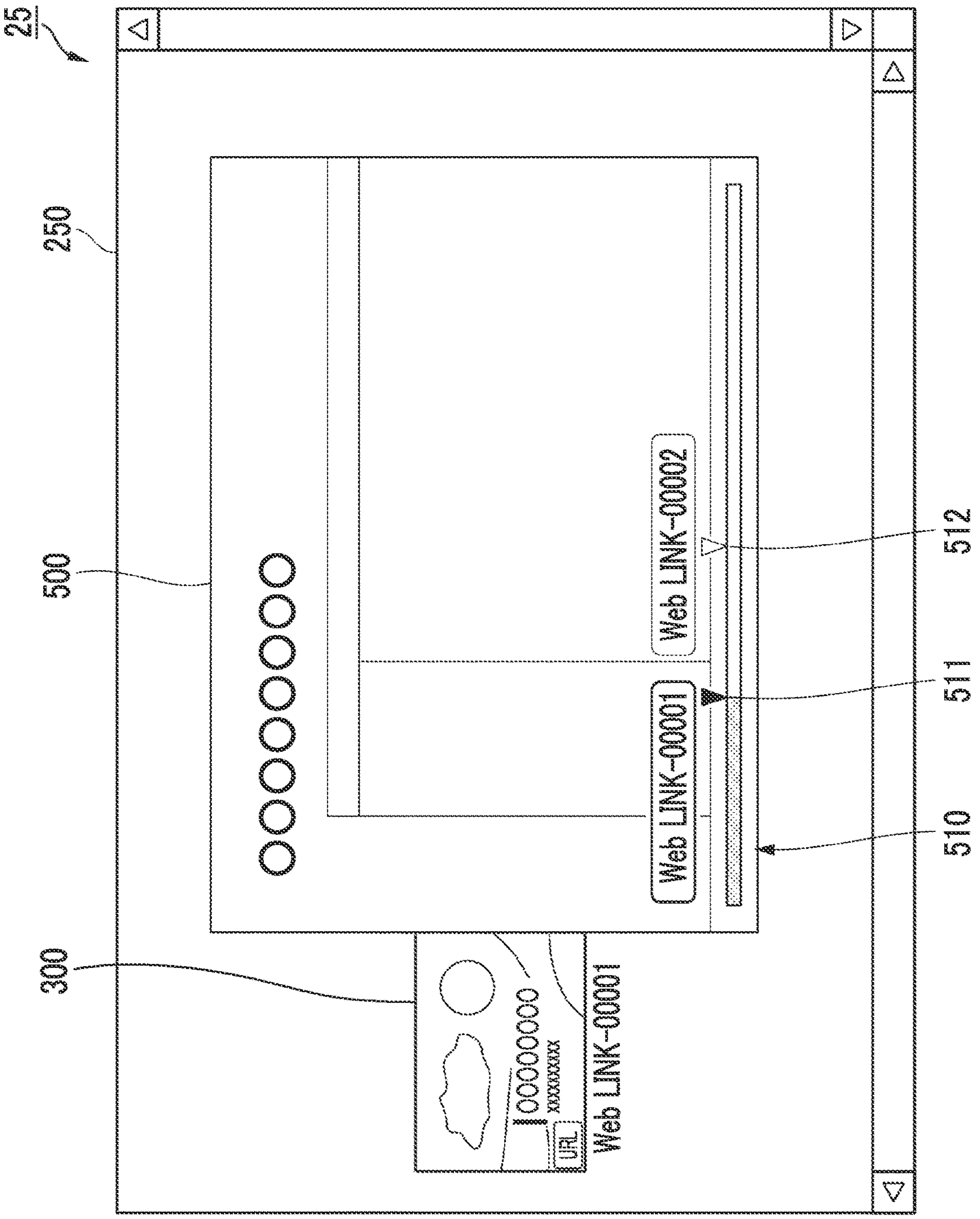
FIG. 14 is a diagram illustrating a link object including a portion functioning as a new link and a portion functioning as an existing link.

FIG. 14 is a diagram illustrating a link object 500 including a portion functioning as a new link and a portion functioning as an existing link.

In FIG. 14, a common object 300 in which a new link and an existing link are combined is arranged on the operation screen 250. The aspect of the object 300 is not limited, and various objects such as text and images may be used. In a case where a predetermined user operation such as mouse over is performed on the object 300, the link object 500 is displayed. The link object 500 includes, for example, a thumbnail image of a moving image designated as a link destination and a seek bar 510 corresponding to a playback time of the moving image, and may be displayed larger than the object 300. The thumbnail image included in the link object 500 may be a still image, but for example, it may be possible to view a simple moving image on the operation screen 250 as a moving image corresponding to the moving image of the link destination.

Further, in the seek bar 510, a portion 511 functioning as an existing link is provided at a location corresponding to the playback start time of the existing link, and a portion 512 functioning as a new link is provided at a location corresponding to the playback start time of the new link. Further, as shown in the drawing, information related to the corresponding link may be displayed in the vicinity of the portion 511 or the vicinity of the portion 512, respectively.

The link object 500 including the thumbnail image and the seek bar 510 is an example, and a portion functioning as a new link and a portion functioning as an existing link may be provided in a link object of another aspect. For example, a link object indicating a list of thumbnail images corresponding to each link may be displayed, and each thumbnail image may be a portion functioning as a corresponding link.

Another Example 2 of Combination of Moving Image Links

Further, for example, the moving image links may be combined by arranging the link object functioning as a new link and the link object functioning as an existing link side by side on the operation screen 250.

Figure 15:
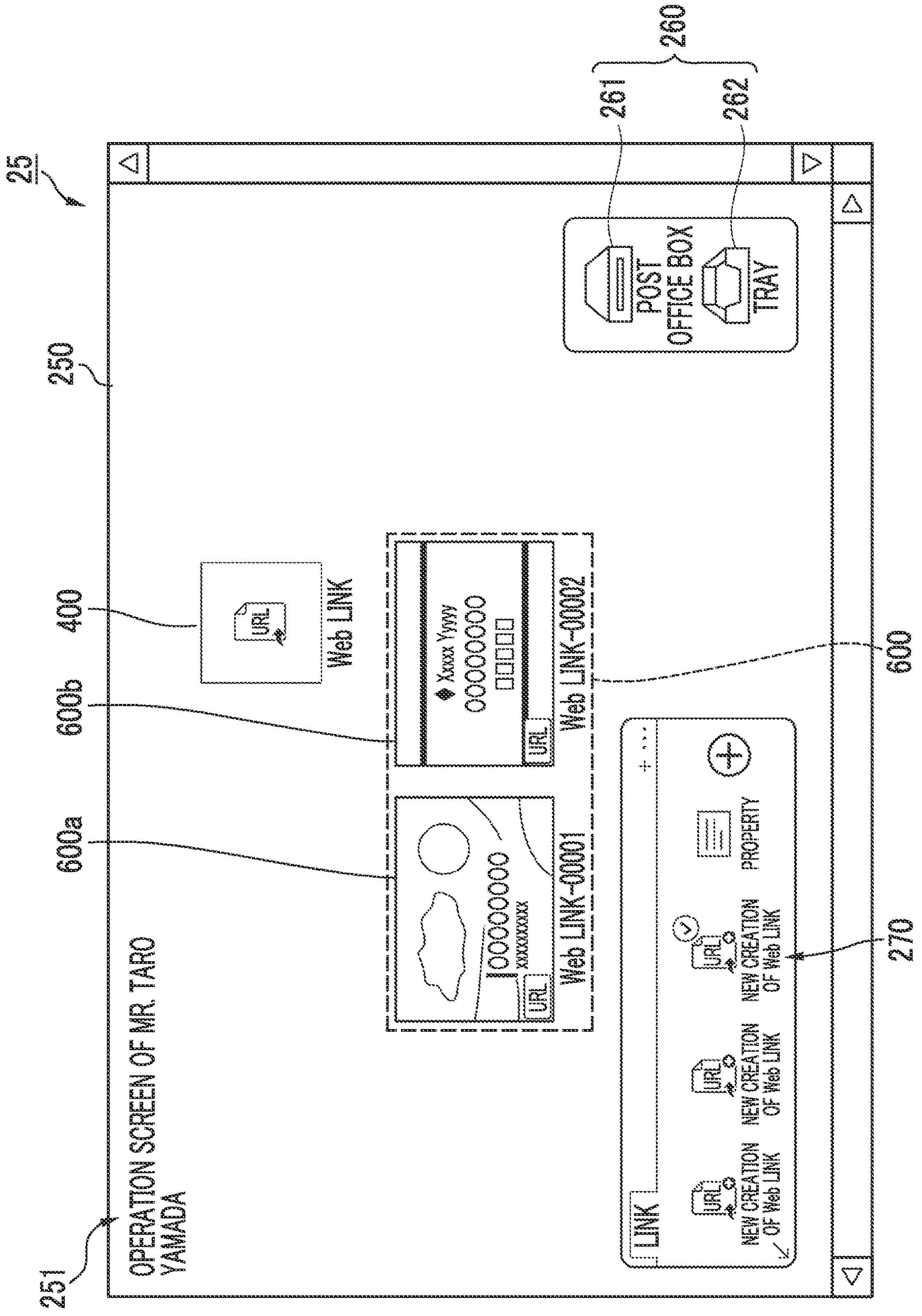
FIG. 15 is a diagram showing a state in which a new link object and an existing link object are arranged side by side.

FIG. 15 is a diagram showing a state in which a new link object 600*a* and an existing link object 600*b* are arranged side by side.

In the example of FIG. 15, in an area 600 indicated by a broken line, the new link object 600*a* corresponding to the new link and the existing link object 600*b* corresponding to the existing link are arranged in a horizontal row and are collectively arranged. The direction in which the new link object 600*a* and the existing link object 600*b* are arranged and the number of columns/rows to be arranged are not limited. Here, the interval at which the new link object 600*a* and the existing link object 600*b* are arranged may be narrower than, for example, intervals between link objects for playing back different moving images and link objects that are not related to the playback of the moving image so that it is easy to ascertain that the link objects are for playing back the same moving image.

Number of Links to Be Combined

In the above-described exemplary embodiment, the case where the two links of the new link and the existing link are combined has been described, but the number of links to be combined is not limited, and three or more links may be combined.

For example, a new link may be added to a link object in which two or more existing links are already combined, and a link object in which three or more links are combined may be created.

Further, on the link creation screen 280, two or more new links may be added to the link object of the existing link, such as collectively receiving the creation of a plurality of new links for which different playback start times are designated, to combine three or more links.

Display of Information on Moving Image Page

In a case where any of the links is used in a state in which the new link and the existing link are combined, for example, information related to the other link may be displayed on the transitioned moving image page. For example, in a case where a new link is used in the link object 300 shown in FIG. 9, for example, information related to the existing link may be displayed at a location of the seek bar displayed together with the moving image on the transitioned moving image page corresponding to the playback start time of the existing link.

Configuration of Information Processing System 1

The configuration of the information processing system 1 described above is an example, and the information processing system 1 as a whole may have a function that implements the above processes. More specifically, some or all of the functions that implement the various types of processes described above may be shared or incorporated in the information processing system 1. For example, some or all of the functions of the server apparatus 10 may be the functions of the terminal apparatus 20, or some of the functions of the terminal apparatus 20 may be the functions of the server apparatus 10. Further, for example, some or all of the functions of each of the server apparatus 10 and the terminal apparatus 20 constituting the information processing system 1 may be transferred to another server or the like (not shown).

In addition, some or all of the functions of the moving image server 90 may be delegated to the server apparatus 10 or the terminal apparatus 20. For example, all the functions of the moving image server 90 may be delegated to the server apparatus 10 and the server apparatus 10 may be configured to provide the moving image page and the link management service.

Processor

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

Program

The processing performed by the information processing system 1 is prepared as, for example, a program such as application software.

In this case, the program implementing the present exemplary embodiment can be understood as a program implementing, on a computer such as the server apparatus 10, a function of displaying an operation screen for receiving an operation from a user on a display unit such as the display unit 25 of the terminal apparatus 20, a function of receiving an instruction to create, on the operation screen, a first link for playing back a moving image designated by the user from a first playback start time, and a function of collectively arranging the first link and a second link on the operation screen in a case where there is the second link for playing back a moving image designated on the operation screen from a second playback start time.

The program implementing the present exemplary embodiment can be not only provided by a communication unit but also provided by storing the program in a recording medium such as a CD-ROM.

Although the exemplary embodiments of the present invention have been described above, the technical scope of the present invention is not limited to the scope of the above-described exemplary embodiments. It is clear from the description of the claims that a combination of a plurality of examples and various modifications or improvements to the above-described exemplary embodiment are also included in the technical scope of the present invention.

Supplementary Note (((1)))

An information processing system comprising:

one or a plurality of processors configured to:

- display an operation screen that receives an operation from a user on a display unit;
- receive an instruction to create, on the operation screen, a first link for playing back a moving image designated by the user from a first playback start time; and
- collectively arrange, in a case where there is a second link for playing back the designated moving image from a second playback start time on the operation screen, the first link and the second link on the operation screen.

(((2)))

The information processing system according to (((1))), wherein the one or plurality of processors are configured to:

collectively arrange the first link and the second link as a common link object switchable between a first state functioning as the first link and a second state functioning as the second link.

(((3)))

The information processing system according to (((2))), wherein the one or plurality of processors are configured to:

arrange, as the link object, a first thumbnail image corresponding to the first playback start time and a second thumbnail image corresponding to the second playback start time of the designated moving image in a superimposed manner; and switch between the first state in which the first thumbnail image is preferentially displayed and the second state in which the second thumbnail image is preferentially displayed in response to a predetermined switching operation by the user.

(((4)))

The information processing system according to (((3))), wherein the one or plurality of processors are configured to:

display an additional image that includes information related to the second link and is added to the second thumbnail image in a visually recognizable manner by the user even in the first state.

(((5)))

The information processing system according to (((4))), wherein the one or plurality of processors are configured to:

receive a predetermined user operation on the additional image displayed in the first state as the predetermined switching operation for switching to the second state.

(((6)))

The information processing system according to (((4))), wherein the one or plurality of processors are configured to:

cause the additional image displayed in the first state to function as the second link.

(((7)))

The information processing system according to (((1))), wherein the one or plurality of processors are configured to:

arrange a common object in which the first link and the second link are combined; and display a link object including a first portion functioning as the first link and a second portion functioning as the second link in response to a predetermined user operation on the object.

(((8)))

The information processing system according to (((7))), wherein the one or plurality of processors are configured to:

display, as the link object, a thumbnail image corresponding to the designated moving image and a seek bar corresponding to a playback time of the designated moving image; and provide the first portion at a location corresponding to the first playback start time of the seek bar, and provide the second portion at a location corresponding to the second playback start time.

(((9)))

The information processing system according to any one of (((1))) to (((8))), wherein the one or plurality of processors are configured to:

inquiry of the user whether or not to create the first link in a case where a predetermined condition related to the first link and the second link is satisfied.

(((10)))

The information processing system according to (((9))), wherein the one or plurality of processors are configured to:

inquiry of the user that a difference between the first playback start time and the second playback start time is within a predetermined range as the predetermined condition related to the first link and the second link.

(((11)))

The information processing system according to any one of (((1))) to (((10))), wherein the one or plurality of processors are configured to:

cause information related to the second link to be displayed on a moving image page for playing back the designated moving image, which is transitioned by the first link.

(((12)))

The information processing system according to (((11))), wherein the one or plurality of processors are configured to:

cause a seek bar corresponding to a playback time of the designated moving image, which is displayed on the moving image page, to display the information related to the second link at a location corresponding to the second playback start time of the seek bar.

(((13)))

The information processing system according to any one of (((1))) to (((12))), wherein the one or plurality of processors are configured to:

notify the user who has created the second link in a case where the first link and the second link are combined.

(((14)))

A program causing a computer to implement:

a function of displaying an operation screen that receives an operation from a user on a display unit;

a function of receiving an instruction to create, on the operation screen, a first link for playing back a moving image designated by the user from a first playback start time; and a function of collectively arranging, in a case where there is a second link for playing back the designated moving image from a second playback start time on the operation screen, the first link and the second link on the operation screen.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:

one or a plurality of processors configured to:

display an operation screen that receives an operation from a user on a display unit;

receive an instruction to create, on the operation screen, a first link for playing back a moving image designated by the user from a first playback start time; and collectively arrange, in a case where there is a second link for playing back the designated moving image from a second playback start time on the operation screen, the first link and the second link as a common link object switchable between a first state functioning as the first link and a second state functioning as the second link on the operation screen.

2. The information processing system according to claim 1, wherein the one or plurality of processors are configured to:

arrange, as the link object, a first thumbnail image corresponding to the first playback start time and a second thumbnail image corresponding to the second playback start time of the designated moving image in a superimposed manner; and switch between the first state in which the first thumbnail image is preferentially displayed and the second state in which the second thumbnail image is preferentially displayed in response to a predetermined switching operation by the user.

3. The information processing system according to claim 2, wherein the one or plurality of processors are configured to:

display an additional image that includes information related to the second link and is added to the second thumbnail image in a visually recognizable manner by the user even in the first state.

4. The information processing system according to claim 3, wherein the one or plurality of processors are configured to:

receive a predetermined user operation on the additional image displayed in the first state as the predetermined switching operation for switching to the second state.

5. The information processing system according to claim 3, wherein the one or plurality of processors are configured to:

cause the additional image displayed in the first state to function as the second link.

6. The information processing system according to claim 1, wherein the one or plurality of processors are configured to:

arrange a common object in which the first link and the second link are combined; and display a link object including a first portion functioning as the first link and a second portion functioning as the second link in response to a predetermined user operation on the object.

7. The information processing system according to claim 6, wherein the one or plurality of processors are configured to:

display, as the link object, a thumbnail image corresponding to the designated moving image and a seek bar corresponding to a playback time of the designated moving image; and provide the first portion at a location corresponding to the first playback start time of the seek bar, and provide the second portion at a location corresponding to the second playback start time.

8. The information processing system according to claim 1, wherein the one or plurality of processors are configured to:

inquiry of the user whether or not to create the first link in a case where a predetermined condition related to the first link and the second link is satisfied.

9. The information processing system according to claim 8, wherein the one or plurality of processors are configured to:

inquiry of the user that a difference between the first playback start time and the second playback start time is within a predetermined range as the predetermined condition related to the first link and the second link.

10. The information processing system according to claim 1, wherein the one or plurality of processors are configured to:

cause information related to the second link to be displayed on a moving image page for playing back the designated moving image, which is transitioned by the first link.

11. The information processing system according to claim 10, wherein the one or plurality of processors are configured to:

cause a seek bar corresponding to a playback time of the designated moving image, which is displayed on the moving image page, to display the information related to the second link at a location corresponding to the second playback start time of the seek bar.

12. The information processing system according to claim 1, wherein the one or plurality of processors are configured to:

notify the user who has created the second link in a case where the first link and the second link are combined.

13. A non-transitory computer readable medium storing a program causing a computer to:

display an operation screen that receives an operation from a user on a display unit;

receive an instruction to create, on the operation screen, a first link for playing back a moving image designated by the user from a first playback start time; and collectively arrange, in a case where there is a second link for playing back the designated moving image from a second playback start time on the operation screen, the first link and the second link as a common link object switchable between a first state functioning as the first link and a second state functioning as the second link on the operation screen.

14. An information processing method comprising:

displaying an operation screen that receives an operation from a user on a display unit;

receiving an instruction to create, on the operation screen, a first link for playing back a moving image designated by the user from a first playback start time; and collectively arranging, in a case where there is a second link for playing back the designated moving image from a second playback start time on the operation screen, the first link and the second link as a common link object switchable between a first state functioning as the first link and a second state functioning as the second link on the operation screen.

* * * * *